US012586406B2

(12) United States Patent
Wang et al.

(10) Patent No.: US 12,586,406 B2
(45) Date of Patent: Mar. 24, 2026

(54) FINGERPRINT ARRAY STRUCTURE, FINGERPRINT SENSOR CHIP, AND ELECTRONIC DEVICE

(71) Applicant: Shenzhen Goodix Technology Co., Ltd., Shenzhen (CN)

(72) Inventors: Chengzuo Wang, Shenzhen City (CN); Yuping Liu, Shenzhen City (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/824,471

(22) Filed: Sep. 4, 2024

(65) Prior Publication Data

US 2025/0191401 A1    Jun. 12, 2025

(30) Foreign Application Priority Data

Dec. 8, 2023    (CN) .......................... 202311682858.6

(51) Int. Cl.
*G06V 40/13*        (2022.01)
(52) U.S. Cl.
CPC ................................. *G06V 40/1306* (2022.01)
(58) Field of Classification Search
None
See application file for complete search history.

(56) References Cited

U.S. PATENT DOCUMENTS

| | | | |
|---|---|---|---|
| 9,058,511 B2 | 6/2015 | Chou | |
| 2016/0305796 A1* | 10/2016 | Wu | G06V 40/1306 |
| 2020/0175242 A1* | 6/2020 | Uehara | G06F 3/0446 |
| 2024/0012512 A1* | 1/2024 | Fang | G06F 3/04166 |

OTHER PUBLICATIONS

Extended European Search Report issued in European Patent Application No. 24201647.5; mailed Feb. 26, 2025 7 pages.

* cited by examiner

*Primary Examiner* — Joseph R Haley
(74) *Attorney, Agent, or Firm* — HAUPTMAN HAM, LLP

(57)    ABSTRACT

Disclosed in the present application is a fingerprint array structure, a fingerprint sensor chip, and an electronic device and relates to the technical field of fingerprint identification. The fingerprint array structure comprises a pixel array, a circuit layer and a plurality of connecting line groups, where the pixel array comprises a plurality of pixel groups, each pixel group comprises at least two pixel units, the circuit layer comprises a plurality of pixel circuits and a plurality of non-pixel circuits, at least one portion of a projection of the circuit layer perpendicularly facing the pixel array overlaps the pixel array, each pixel circuit is electrically connected to one pixel group through one connecting line group. According to the present application, the proportion of the pixel array of the present application is higher and the chip area is smaller on the condition that the size specifications of pixel arrays are the same.

9 Claims, 5 Drawing Sheets

FINGERPRINT ARRAY STRUCTURE, FINGERPRINT SENSOR CHIP, AND ELECTRONIC DEVICE

CROSS REFERENCE TO RELATED APPLICATIONS

The present application claims priority from Chinese Application Number 202311682858.6, filed Dec. 8, 2023, the disclosure of which is hereby incorporated by reference herein in its entirety.

TECHNICAL FIELD

The present application relates to the technical field of fingerprint identification, and in particular to a fingerprint array structure, a fingerprint sensor chip and an electronic device.

BACKGROUND

Sensor chips are mostly composed of pixel arrays and various circuit modules, and the proportion of a pixel array is one of the key competitiveness of sensor chips, and is defined as: proportion of a pixel array=pixel array area÷chip area. The pixel array proportion of an existing capacitive fingerprint sensor chips is usually between 60% and 75%, especially the pixel array proportion of a small-area capacitive fingerprint sensor chip is lower. Therefore, how to increase the proportion of a pixel array in a chip and reduce the area of a chip is urgent technical problems which need to be solved by those skilled in the art.

SUMMARY

Aiming at the shortcomings in the prior art, the embodiments of the present application provide a fingerprint array structure, a fingerprint sensor chip, and an electronic device to solve at least some of the above-mentioned technical problems.

In order to realize the above-mentioned technical purposes, according to a first aspect of the embodiments of the present application, there is provided a fingerprint array structure, including:

a pixel array, where the pixel array includes a plurality of pixel units arranged in an array, the plurality of pixel units are divided into a plurality of pixel groups, and each pixel group includes at least two pixel units;

a circuit layer, where the circuit layer includes a plurality of pixel circuits and a plurality of non-pixel circuits, and at least one portion of a projection of the circuit layer perpendicularly facing the pixel array overlaps the pixel array;

a plurality of connecting line groups, where each connecting line group includes a plurality of connecting lines, each connecting line is connected to one pixel unit, and each pixel circuit is electrically connected to a plurality of pixel units of one pixel group through one connecting line group.

Further, the pixel units located on the same row or the same column of the pixel array constitute one pixel group.

Further, connecting terminals of the plurality of connecting line groups are positioned on the same end.

Further, connecting terminals of the plurality of connecting line groups are positioned on the outer side of an area where the pixel array is located.

Further, projections of the non-pixel circuits and the pixel circuits perpendicularly facing the pixel array are all positioned on the pixel array.

Further, the fingerprint array structure further includes a shielding layer, and a projection of the shielding layer perpendicularly facing the pixel array at least partially overlaps the projection of the non-pixel circuits perpendicularly facing the pixel array.

Further, the shielding layer includes power supplies.

Further, the shielding layer includes ground networks.

Further, the shielding layer includes power supplies and ground networks, and the power supplies and the ground networks are spaced apart from each other in a long strip shape.

According to a second aspect of the embodiments of the present application, there is provided a fingerprint sensor chip, including the above fingerprint array structure.

Further, the area outside the fingerprint array structure is provided with an IO circuit.

According to a third aspect of the embodiments of the present application, there is provided an electronic device, including the above fingerprint sensor chip.

The beneficial effects of the embodiments of the present application are as follows:

According to the embodiments of the present application, through arranging at least portion of the circuit layer and the pixel array in an overlapping manner, the area of the fingerprint array structure can be reduced. When the fingerprint array structure is applied to a chip, the proportion of the pixel array of the present application is higher and the chip area is smaller on the condition that the size specifications of pixel arrays are the same.

REFERENCE NUMERALS IN THE FIGURES

1. Pixel array; 11. Pixel unit; 2. Connecting line group; 21. Connecting terminal; 22. Connecting line; 3. Shielding layer; 4. Pixel circuit; and 5. Non-pixel circuit.

DETAILED DESCRIPTION OF THE EMBODIMENTS

By combining the drawings of the description, the fingerprint array structure and the fingerprint sensor chip provided in the present application will be explained and demonstrated in detail below.

Figure 1:
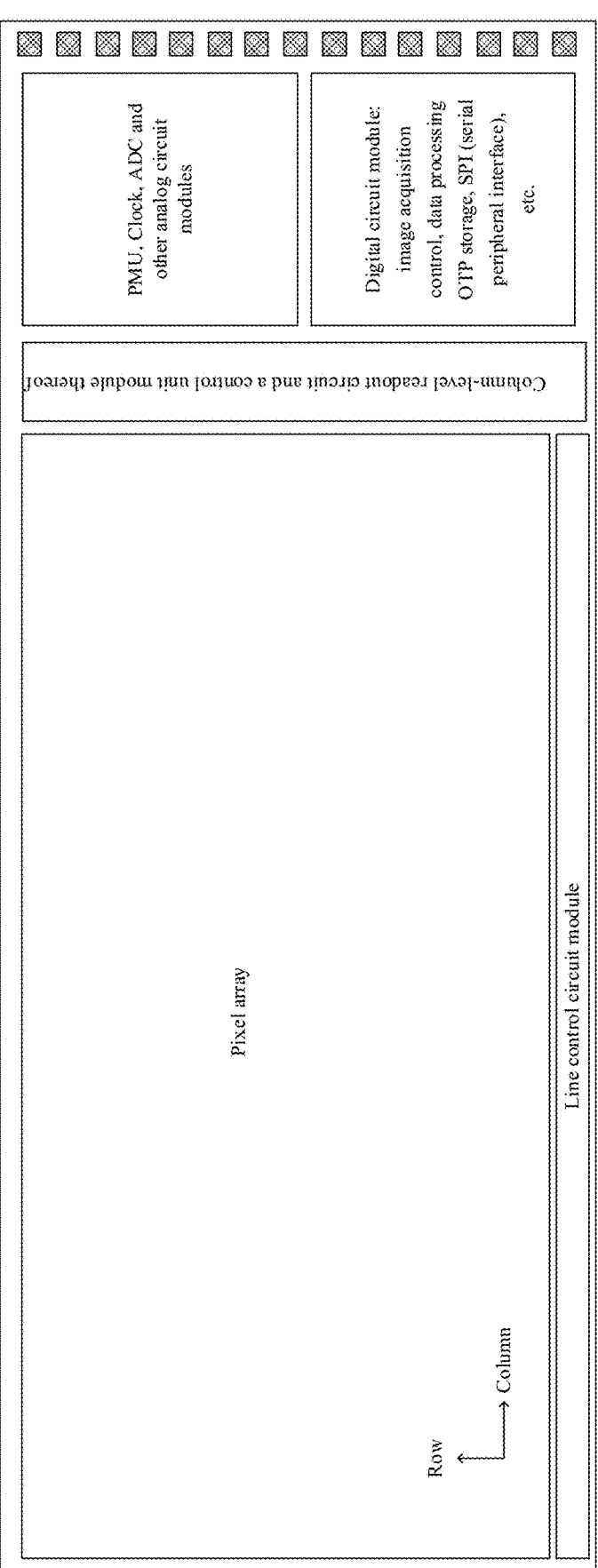
FIG. 1 is a schematic structural diagram of the layout of a circuit module of a capacitive fingerprint sensor chip in the prior art.

The layout of a circuit module of a common capacitive fingerprint sensor chip is shown in FIG. 1, and the circuit module is composed of a pixel array, a line control circuit module, a column-level readout circuit and a control unit module thereof, other analog circuit modules and digital circuit modules, an IO (Input/Output) circuit module, etc. The pixel array is a matrix composed of pixel units in X rows and Y columns, a finger capacitive induction polar plate is called a pixel unit, and generally one pixel unit corresponds to one readout circuit. The readout circuit corresponding to the pixel unit and the control circuit of the pixel unit are called pixel circuits, and the remaining circuits are called non-pixel circuit. As shown in FIG. 1, the non-pixel circuit module is distributed outside the array in the prior art, and the proportion of a pixel array=pixel array area÷chip area. Therefore, the layout in the prior art enables the proportion of the pixel array to be lower.

According to a first aspect of the embodiments of the present application, a fingerprint array structure is provided and is particularly applicable to a capacitive fingerprint array. According to the embodiments of the present application, the circuit layer and the pixel array are arranged in a partially or fully overlapping manner, so that the area of the capacitive fingerprint sensor chip is reduced. According to the fingerprint array structure, the non-pixel circuit can be placed below the pixel array to enable the pixel circuit and the non-pixel circuit to share the area of the pixel array, so that the chip area is greatly reduced, and the proportion of the pixel array is increased.

Figure 2:
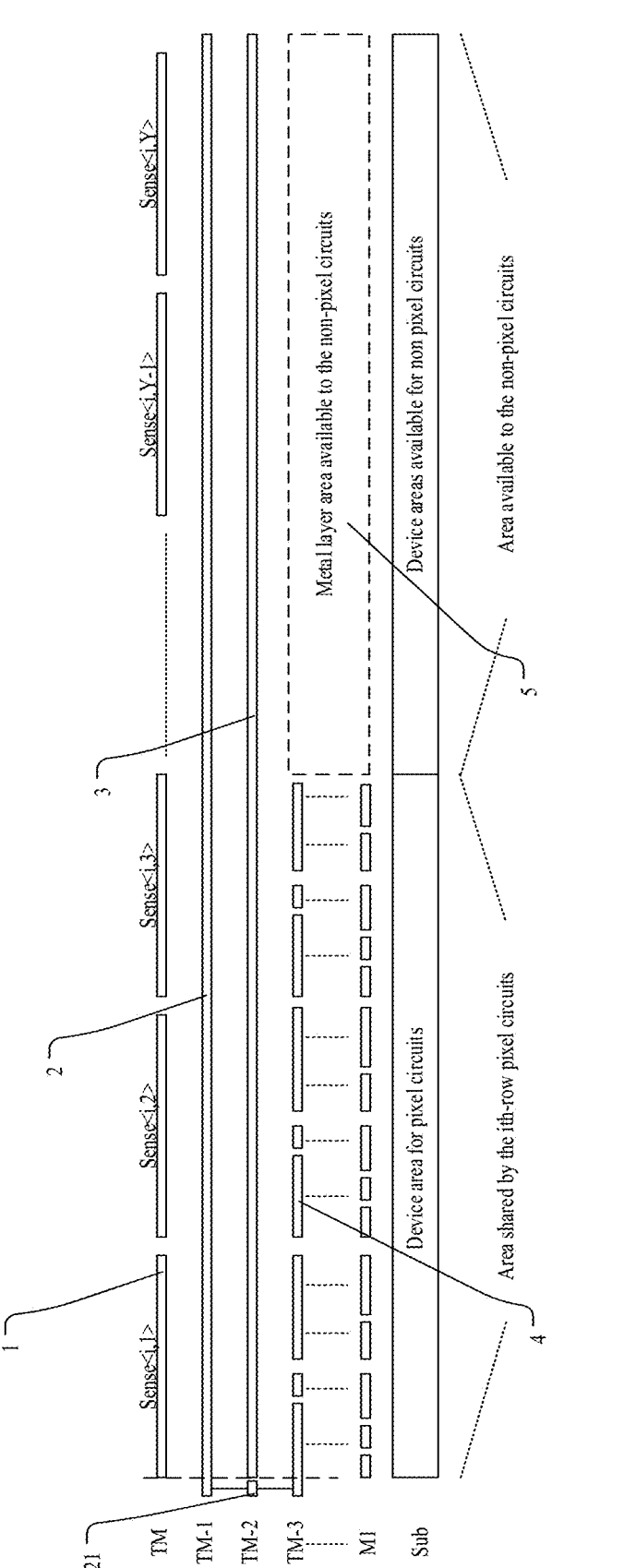
FIG. 2 is a schematic structural diagram of an cross section of a fingerprint array structure according to one embodiment of the present application.
Figure 3:
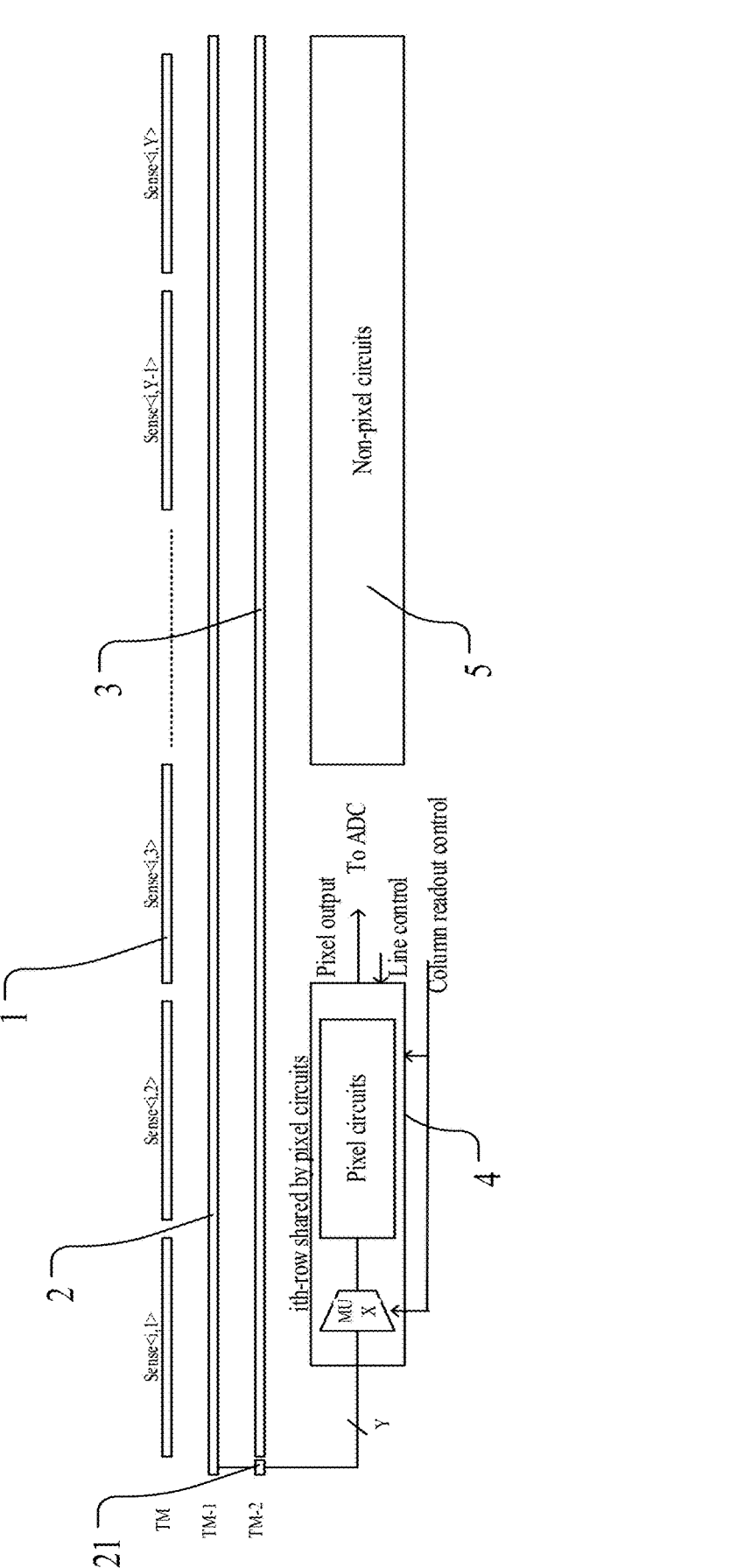
FIG. 3 is a schematic structural diagram of an cross section of a fingerprint array structure according to one embodiment of the present application.

In some embodiments, as shown in FIGS. 2 and 3, the fingerprint array structure provided by the present application includes a pixel array 1, a plurality of connecting line groups 2 and a circuit layer, where the circuit layer includes pixel circuits 4 and non-pixel circuits 5, and at least one portion of the circuit layer overlaps the pixel array 1. The pixel array 1 includes a plurality of pixel units 11 arranged in an array, optionally, the plurality of pixel units 11 are distributed in a rectangular array and constitute a pixel group, one pixel group is connected to one pixel circuit 4, that is, a plurality of pixel units 11 in the same pixel group are connected to the same pixel circuit 4. Optionally, in the embodiment, a plurality of pixel units 11 on the same row or same column of the pixel array 1 constitute one pixel group.

A plurality of pixel circuits 4 are arranged, each pixel circuit 4 is connected to one pixel group, and a plurality of pixel units 11 in the same pixel group multiplex one pixel circuit 4 in a time-sharing manner. The number of the pixel circuits 4 is small than that of the pixel units 11, so that the area of the pixel circuits 4 can be reduced. In the embodiment, the pixel circuits 4 and the non-pixel circuits 5 are positioned on the same layer, in addition, projections of the non-pixel circuits 5 and the pixel circuits 4 perpendicularly facing the pixel array 1 are all positioned on the pixel array 1, that is, the areas of the projections of the non-pixel circuits 5 and the pixel circuits 4 perpendicularly facing the pixel array 1 are less than or equal to the area of the pixel array 1, and the proportion of the pixel array 1 can be increased, so that the performance of a small-area chip can be improved.

In some embodiments, the pixel groups and the pixel circuits 4 are electrically connected through the connecting line groups 2, each pixel circuit 4 corresponds to one connecting line group 2, each connecting line group 2 includes a plurality of connecting lines 22, each connecting line 22 is connected to one pixel unit 11, and a plurality of connecting lines 22 are connected to the pixel circuits 4 through the connecting terminals.

Optionally, connecting terminals 21 of the plurality of connecting line groups 2 are positioned on the same end of the connecting line groups 2, so that the pixel circuits 4 are positioned on the same end of the pixel array 1 to provide a more regular area to arrange the non-pixel circuits 5, that is, the non-pixel circuits 5 can be arranged in the same area.

In the embodiment, connecting terminals 21 of the plurality of connecting line groups 2 are positioned on the outer side of an area where the pixel array 1 is located to ensure consistency of the pixel array 1, for example, to ensure the thickness of the pixel array, and the consistency of the pixel units 11 with stray capacitance of metals around, so that local thickness of the pixel array 1 and the stray capacitance are prevented from being non-uniform due to arrangement of the connecting terminals 21. Only an exemplary introduction to the arrangement manner of the connecting terminals 21 is given in the embodiment. In other embodiments, the connecting terminals 21 can be arranged at any positions, which will not affect the function of the array structure and will only cause certain difference on the consistency of the array structure.

In some embodiments, the shielding layer 3 is further included and is at least arranged between the non-pixel circuits 5 and the connecting line groups 2, and in addition, the projection of the shielding layer 3 perpendicularly facing the pixel array 1 at least overlaps the projection of the non-pixel circuits 5, that is, the shielding layer 3 at least isolates the non-pixel circuits 5. The function of the shielding layer 3 is to isolate the pixel units 11 and the connecting line groups 2 from the area of the non-pixel circuits 5, so that the non-pixel circuits 5 can be prevented from interfering with normal operation of the pixel units 11 above the non-pixel circuits 5 to avoid louder noise and larger interference.

Optionally, areas of the non-pixel circuits 5 and pixel circuits 4 are provided with the shielding layers 3, so that the shielding layers 3 can form a complete layer to ensure thickness consistency of the array structure and enable the non-pixel circuits 5 and pixel circuits 4 to be on the same layer.

In some embodiments, the shielding layer 3 includes power supplies or ground networks, and a magnetic field can be formed through the power supplies or the ground networks, so that the non-pixel circuits 5 can be prevented from interfering with normal operation of the pixel units 11 above the non-pixel circuits 5 to avoid louder noise and larger interference. The power supply includes a source terminal of each circuit or element in the fingerprint array structure, the ground network is composed of a ground wire or a zero line of each circuit and element. Or in other embodiments, the shielding layer 3 includes power supplies and ground networks, the power supplies and ground networks are of strip-shaped structures and are spaced apart from each other at equal intervals, the array structure and all power supplies and ground networks of the chip are distributed at equal intervals to form the shielding layer 3, in this way, the shielding layer 3 can also serve as the power supplies and ground networks of the pixel circuits 4 and the non-pixel circuits 5, so that resources and the using layers of metal layers can be saved, and optionally, the power supplies and ground networks are spaced apart from each other.

The embodiments of the present application solve the technical problem in the prior art that the non-pixel circuits 5 occupy a larger chip area to reduce the proportion of the pixel array 1. Through arranging the non-pixel circuits 5 and the pixel array 1 in a stacked manner, the proportion of the pixel array 1 of a capacitive fingerprint sensor chip can be increased to above 90%, and in a pixel array 1 of a chip with a larger area, the proportion of the pixel array 1 can even be close to 98%. Compared with the prior art, on the condition that the size specifications of the arrays are the same, the proportion of the pixel array disclosed in the present application is the highest, the chip area is the smallest, and the cost is the lowest.

Figure 4:
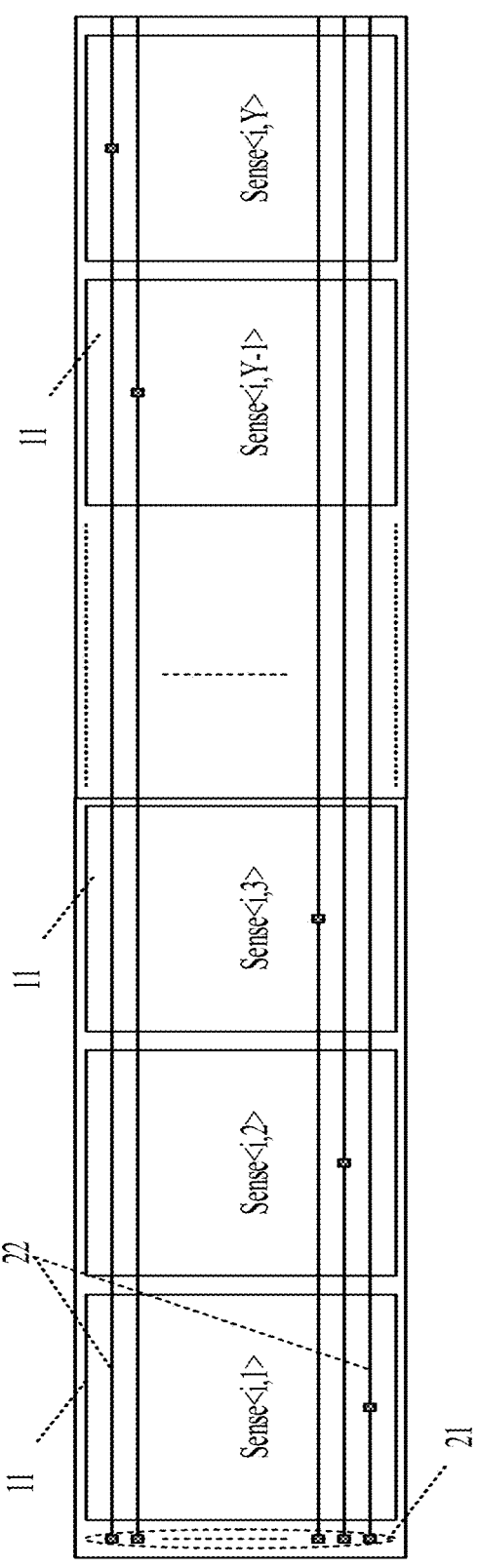
FIG. 4 is a schematic structural diagram of a top view of a fingerprint array structure according to one embodiment of the present application.

In one embodiment, as shown in FIGS. 2 and 3, take the pixel units 11 on the same row constituting a pixel group as an example, each pixel unit 11 is composed of top-layer metal polar plates, and a plurality of substrates on the same row constitute one pixel group. Lower-layer metal of the top-layer metal polar plates constitute a connecting line group 2, and in the embodiment, connecting terminals 21 of the connecting line group 2 are positioned at the tail end of the connecting line group 2 (the left side as shown in FIGS. 2 and 3, and in other embodiments, also can be arranged on the right side), so that a plurality of pixel units 11 on the same row can multiplex the same pixel circuit 4 in a time-sharing manner to output pixel signals. The shielding layer 3 is formed on the lower layer of the connecting line group 2 to isolate the pixel units 11 and the connecting line group 2 from the area of the non-pixel circuits, so that the non-pixel circuits 5 can be prevented from interfering with normal operation of the pixel units 11 above the non-pixel circuits 5 to avoid louder noise and larger interference. In the embodiment, as shown in FIG. 4, a projection drawing of the shielding layer 3 overlaps that of an area in which the pixel circuits 4 and the non-pixel circuits 5 are positioned.

The pixel circuits 4 and the non-pixel circuits 5 are arranged on the lower layer of the shielding layer 3, where the pixel circuits 4 are arranged close to the left side, that is arranged close to connecting terminals 21 of the connecting line group 2. In the embodiment, the pixel circuits 4 occupy an area corresponding to first to third columns of pixel units 11, and the area corresponding to other columns of pixel units 11 are configured to arrange the non-pixel circuits 5.

The pixel units 11 on the same row or same column of the fingerprint array structure provided by the embodiments of the present application share the pixel circuits 4, a larger area on the lower side of the pixel array 1 can be reserved to arrange the non-pixel circuits 5, and the shielding layer 3 is also arranged to isolate the pixel units 11 and the connecting line groups 2 from the non-pixel circuits 5, so that the non-pixel circuits 5 can be prevented from interfering with normal operation of the pixel units 11 above the non-pixel circuits 5 to avoid louder noise and larger interference.

Figure 5:
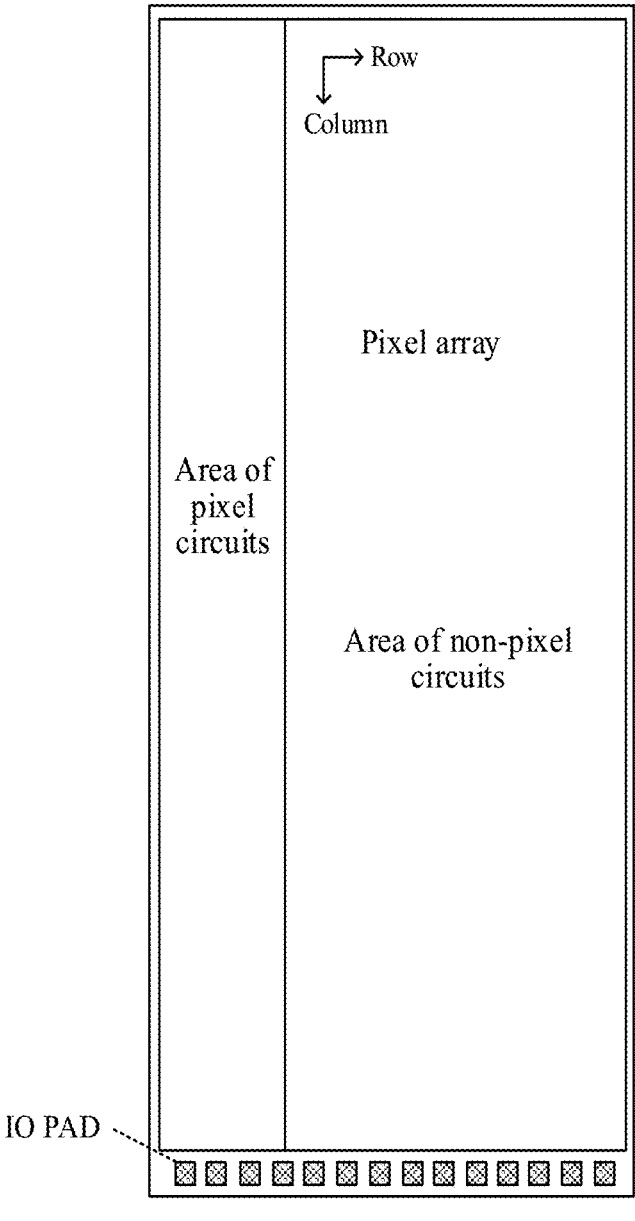
FIG. 5 is a schematic structural diagram of a fingerprint sensor chip framework according to one embodiment of the present application.

According to a second aspect of the embodiments of the present application, a fingerprint sensor chip is provided, as shown in FIG. 5, the fingerprint sensor chip includes the fingerprint array structure, as shown in FIG. 5, only an IO circuit and necessary spaces specified by the process are arranged at the area outside the fingerprint array structure, so that the chip can have a higher proportion of the pixel array 1.

According to a third aspect of the embodiments of the present application, an electronic device is provided, including the fingerprint sensor chip. Optionally, the electronic device includes a smartphone, a tablet computer, a laptop, and a fingerprint lock with a fingerprint identification function.

In the description of the present application, it needs to be noted that, orientations or positional relationships indicated by the terms "center", "longitudinal", "transversal", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on orientations or positional relationships shown in the drawings, and are only for the convenience of describing the present application and simplifying the description, rather than indicating or implying that the apparatus or element referred to must have a specific orientation, be constructed and operated in a specific orientation, and therefore cannot be understood as a limitation on the present application.

In the present application, unless otherwise clearly specified and limited, the terms "installed", "connected", "connection", "fixed", etc. should be understood broadly. For example, the "connection" may be a fixed connection, a detachable connection, or integrated connection, may be a mechanical connection or an electrical connection, may be a direct connection or an indirect connection by means of an intermediate medium, or may be an internal connection of two elements or an interaction between two elements, unless otherwise clearly defined. For those of ordinary skill in the art, the specific meaning of the terms in the present application may be understood according to specific situations.

In the description of this specification, descriptions of the reference terms "the embodiment", "one embodiment", "some embodiments", "example", "specific example", or "some examples", etc. mean that specific features, structures, materials, or characteristics described in connection with the embodiment or example are included in at least one embodiment or example of the present application. In this specification, schematic expressions of the above terms need not be directed to the same embodiment or example. Moreover, the described specific feature, structure, material, or characteristic can be combined in any suitable way in one or more embodiments or examples. In addition, different embodiments or examples described in this specification and features of different embodiments or examples may be combined by those skilled in the art without contradicting one another.

In addition, the terms "first" and "second" are merely used for description purposes and cannot be interpreted as indicating or implying relative importance or implicitly indicating the number of technical features indicated. Therefore, the features defined with "first" and "second" can explicitly or implicitly include one or more features. In the description of the present application, "a plurality of" means at least two, e.g., two, three, etc., unless otherwise specified.

The above descriptions are only preferred embodiments of the present application, and are not intended to limit the present application. Any modifications, equivalent replacements, simple improvements etc. made within the substantive content of the present application shall be included in the protection scope of the present application.

What is claimed is:

1. A fingerprint array structure, comprising:

a pixel array, wherein the pixel array comprises a plurality of pixel units arranged in an array, the plurality of pixel units are divided into a plurality of pixel groups, and each pixel group comprises at least two pixel units;

a circuit layer, wherein the circuit layer comprises a plurality of pixel circuits and a plurality of non-pixel circuits, wherein projections of the non-pixel circuit and the pixel circuit perpendicularly facing the pixel array are all positioned on the pixel array;

a shielding layer, and a projection of the shielding layer perpendicularly facing the pixel array at least partially overlaps the projection of the non-pixel circuit perpendicularly facing the pixel array, wherein the shielding layer comprises power supplies and ground networks, and the power supplies and the ground networks are spaced apart from each other in a long strip shape; and a plurality of connecting line groups, wherein each connecting line group comprises a plurality of connecting lines, each connecting line is connected to one pixel unit, and each pixel circuit is electrically connected to a plurality of pixel units of one pixel group through one connecting line group.

2. The fingerprint array structure according to claim 1, wherein the pixel units located on the same row or the same column of the pixel array constitute one pixel group.

3. The fingerprint array structure according to claim 1, wherein connecting terminals of the plurality of connecting line groups are positioned on the same end.

4. The fingerprint array structure according to claim 3, wherein connecting terminals of the plurality of connecting line groups are positioned on the outer side of an area where the pixel array is located.

5. The fingerprint array structure according to claim 1, wherein the shielding layer comprises power supplies.

6. The fingerprint array structure according to claim 1, wherein the shielding layer comprises ground networks.

7. A fingerprint sensor chip, comprising the fingerprint array structure according to claim 1.

8. The fingerprint sensor chip according to claim 7, wherein the area outside the fingerprint array structure is provided with an IO circuit.

9. An electronic device, comprising the fingerprint sensor chip according to claim 7.

\* \* \* \* \*